(12) United States Patent
Ganesan et al.

(10) Patent No.: US 12,550,062 B2
(45) Date of Patent: Feb. 10, 2026

(54) RADIO RESOURCE CONFIGURATION FOR POWER SAVING

(71) Applicant: Lenovo (Singapore) Pte. Ltd., New Tech Park (SG)

(72) Inventors: Karthikeyan Ganesan, Nauheim (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 490 days.

(21) Appl. No.: 18/016,147

(22) PCT Filed: Jul. 12, 2021

(86) PCT No.: PCT/IB2021/056259
§ 371 (c)(1),
(2) Date: Jan. 13, 2023

(87) PCT Pub. No.: WO2022/013717
PCT Pub. Date: Jan. 20, 2022

(65) Prior Publication Data
US 2023/0262601 A1    Aug. 17, 2023

Related U.S. Application Data

(60) Provisional application No. 63/051,233, filed on Jul. 13, 2020, provisional application No. 63/051,184, (Continued)

(51) Int. Cl.
H04W 52/02    (2009.01)
H04L 1/1812   (2023.01)
(Continued)

(52) U.S. Cl.
CPC ....... H04W 52/0235 (2013.01); H04L 1/1812 (2013.01); H04L 5/0055 (2013.01);
(Continued)

(58) Field of Classification Search
CPC ............. H04W 52/0235; H04W 52/02; H04W 52/0216; H04W 52/0245; H04W 76/28;
(Continued)

(56) References Cited

U.S. PATENT DOCUMENTS

2012/0120828 A1    5/2012   Anderson et al.
2017/0048903 A1    2/2017   Yi et al.
(Continued)

FOREIGN PATENT DOCUMENTS

CN    110574443 A    12/2019
EP     3500028 A1     7/2017
(Continued)

OTHER PUBLICATIONS

U.S. Appl. No. 18/016,151, "Office Action Summary", U.S. Patent and Trademark Office, Apr. 11, 2025, pp. 1-28.
(Continued)

*Primary Examiner* — Brian T Le
(74) *Attorney, Agent, or Firm* — Kunzler Needham & Hilton

(57) ABSTRACT

Apparatuses, methods, and systems are disclosed for radio resource configuration for power saving. One method includes monitoring, via a first receiver including a wake-up receiver, a sidelink control channel for a WUS. The method includes monitoring, via a second receiver, a physical sidelink control channel and a data channel. The second receiver includes a baseband processing unit separate from the first receiver. The method includes receiving a radio resource configuration for WUS reception. The method includes receiving, outside an active period, the WUS in a resource (Continued)

indicated by the radio resource configuration. The method includes determining to wake-up the second receiver based on the WUS. The WUS includes a wake-up indicator bit, a destination identifier, or a combination thereof.

14 Claims, 9 Drawing Sheets

Related U.S. Application Data filed on Jul. 13, 2020, provisional application No. 63/051,207, filed on Jul. 13, 2020, provisional application No. 63/051,217, filed on Jul. 13, 2020.

(51) Int. Cl.
| | | |
|---|---|---|
| *H04L 5/00* | (2006.01) | |
| *H04W 28/02* | (2009.01) | |
| *H04W 72/04* | (2023.01) | |
| *H04W 72/232* | (2023.01) | |
| *H04W 72/25* | (2023.01) | |
| *H04W 72/40* | (2023.01) | |
| *H04W 76/14* | (2018.01) | |
| *H04W 76/28* | (2018.01) | |

(52) U.S. Cl.
CPC ... *H04W 28/0268* (2013.01); *H04W 52/0216* (2013.01); *H04W 52/0245* (2013.01); *H04W 72/04* (2013.01); *H04W 72/232* (2023.01); *H04W 72/25* (2023.01); *H04W 72/40* (2023.01); *H04W 76/14* (2018.02); *H04W 76/28* (2018.02)

(58) Field of Classification Search
CPC . H04W 76/14; H04W 36/0083; H04W 36/06; H04W 8/005; H04W 84/18; H04W 88/08; H04W 72/25; H04W 72/20; H04W 72/40; H04W 72/02; H04W 72/04; H04W 72/12; H04W 72/232; H04W 72/23; H04W 72/11; H04W 72/115; H04W 28/0268; H04W 28/24; H04W 16/00; H04B 7/024; H04L 1/001; H04L 1/1812; H04L 1/1861; H04L 5/00; H04L 5/0055
See application file for complete search history.

(56) References Cited

U.S. PATENT DOCUMENTS

| | | |
|---|---|---|
| 2019/0174411 A1 | 6/2019 | Xu et al. |
| 2019/0313375 A1 | 10/2019 | Loehr et al. |
| 2020/0029318 A1 | 1/2020 | Guo |
| 2020/0053647 A1 | 2/2020 | Chae et al. |
| 2020/0100179 A1 | 3/2020 | Zhou et al. |
| 2020/0122907 A1 | 4/2020 | Dao et al. |
| 2020/0374971 A1 | 11/2020 | Liu et al. |
| 2021/0059004 A1 | 2/2021 | Wu et al. |
| 2021/0227465 A1 | 7/2021 | Kung et al. |
| 2022/0312241 A1 | 9/2022 | Xu et al. |
| 2022/0353815 A1 | 11/2022 | Lin et al. |
| 2022/0377662 A1 | 11/2022 | Sun et al. |
| 2023/0199578 A1 | 6/2023 | Wu et al. |
| 2023/0232492 A1 | 7/2023 | Han et al. |
| 2023/0262738 A1 | 8/2023 | Loehr et al. |
| 2023/0276364 A1 | 8/2023 | Basu Mallick et al. |
| 2023/0276527 A1 | 8/2023 | Karampatsis et al. |

FOREIGN PATENT DOCUMENTS

| | | |
|---|---|---|
| WO | 2016089294 A1 | 9/2016 |
| WO | 2017204726 A1 | 11/2017 |
| WO | 2018016882 A1 | 1/2018 |
| WO | 2018175760 A1 | 9/2018 |
| WO | 2020060890 A1 | 3/2020 |

OTHER PUBLICATIONS

U.S. Appl. No. 18/016,119, "Office Action Summary", U.S. Patent and Trademark Office, Apr. 10, 2025, pp. 1-44.
PCT/IB2021/056211, "Notification of Transmittal of the International Search Report and the Written Opinion of the International Searching Authority, or the Declaration", International Searching Authority, Oct. 18, 2021, pp. 1-17.
PCT/IB2021/056259, "Notification of Transmittal of the International Search Report and the Written Opinion of the International Searching Authority, or the Declaration", International Searching Authority, Dec. 23, 2021, pp. 1-23.
PCT/IB2021/056208, "Notification of Transmittal of the International Search Report and the Written Opinion of the International Searching Authority, or the Declaration", International Searching Authority, Jan. 7, 2022, pp. 1-21.
PCT/IB2021/056209, "Notification of Transmittal of the International Search Report and the Written Opinion of the International Searching Authority, or tjhe Declaration", International Searching Authority, Jan. 24, 2022, pp. 1-25.
PCT/IB2021/056208, "Invitation to Pay Additional fees and, Where Applicable, Protest Fee", International Searching Authority, Nov. 8, 2021, pp. 1-17.
LG Electronics, "Discussion on NR sidelink resource allocation for Mode 1", 3GPP TSG RAN WG1 #100bis R1-2001885, Apr. 20-30, 2020, pp. 1-28.
Sequans Communications, "Sidelink maintenance for evolved L2 relay", 3GPP TSG-RAN WG2#98 R2-1705126, May 15-19, 2017, pp. 1-4.
Huawei et al., "Discussion on remaining MAC open issues for 5G V2X with NR SL", 3GPP TSG-RAN WG2 Meeting #109-bis electronic R2-20xxxxx, Apr. 20-30, 2020, pp. 1-28.
Lenovo, "Remaining MAC Issues", 3GPP TSG RAN WG2 Meeting#110-e R2-2005039, Jun. 1-12, 2020, pp. 1-10.
LG Electronics, "WID revision: NR sidelink enhancement", 3GPP TSG RAN Meeting #88e RP-201385, Jun. 29-Jul. 3, 2020, pp. 1-6.
Qualcomm Inc et al., "New Solution: QoS aware power efficient PC5 communication", SA WG2 Temporary Document S2-2004714, Jun. 1-12, 2020, pp. 1-4.
Lenovo et al., "KI#1, SoI#5: Additional option on PC5 DRX configuration", 3GPP TSG-SA WG2 Meeting #141e S2-2007237, Oct. 12-23, 2020, pp. 1-6.
3GPP, "3rd Generation Partnership Project; Technical Specification Group Services and System Aspects; Study on architecture enhancements for 3GPP support of advanced Vehicle-to-Everything (V2X) services; Phase 2 (Release 17)", 3GPP TR 23.776 V0.1.0, Jun. 2020, pp. 1-11.
3GPP, "3rd Generation Partnership Project; Technical Specification Group Services and System Aspects; Study on security aspects of 3GPP support for advanced Vehicle-to-Everything (V2X) services (Release 16)", 3GPP TR 33.836 V16.0.0, Jul. 2020, pp. 1-51.
3GPP, "3rd Generation Partnership Project; Technical Specification Group Services and System Aspects; Service requirements for V2X services; Stage 1 (Release 15)", 3GPP TS 22.185 V15.0.0, Jun. 2018, pp. 1-14.
3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.2.0, Mar. 2020, pp. 1-53.
3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

(56) References Cited

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.1.0, Mar. 2020, pp. 1-386.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

LG Electronics, "Summary of email discussion on Rel-17 sidelink enhancement", 3GPP TSG RAN #86 RP-192745, Dec. 9-12, 2019, pp. 1-27.

3GPP, "3rd Generation Partnership Project; Technical Specification Group Radio Access Network; Study on LTE Device to Device Proximity Services; Radio Aspects (Release 12)", 3GPP TR 36.843 V12.0.1, Mar. 2014, pp. 1-50.

3GPP, "3rd Generation Partnership Project; Technical Specification Group Radio Access Network; Study on evaluation methodology of new Vehicle-to-Everything (V2X) use cases for LTE and NR; (Release 15)", 3GPP TR 37.885 V15.3.0, Jun. 2019, pp. 1-38.

3GPP, "3rd Generation Partnership Project; Technical Specification Group Radio Access Network; NR; Study on User Equipment (UE) power saving in NR (Release 16)", 3GPP TR 38.840 V16.0.0, Jun. 2019, pp. 1-74.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

RADIO RESOURCE CONFIGURATION FOR POWER SAVING

CROSS-REFERENCE TO RELATED APPLICATIONS

This application claims priority to U.S. patent application Ser. No. 63/051,184 entitled "APPARATUSES, METHODS, AND SYSTEMS FOR A SIDELINK DRX MECHANISM-INTERACTION WITH UU DRX OPERATION" and filed on Jul. 13, 2020 for Joachim Loehr, U.S. Patent Application Ser. No. 63/051,207 entitled "APPARATUSES, METHODS, AND SYSTEMS FOR SIDELINK POWER SAVING USING A DRX MECHANISM AND MINIMIZING ENSUING HALF DUPLEX ISSUES" and filed on Jul. 13, 2020 for Prateek Basu Mallick, U.S. Patent Application Ser. No. 63/051,217 entitled "APPARATUSES, METHODS, AND SYSTEMS FOR SUPPORTING POWER SAVING FOR PC5 COMMUNICATIONS" and filed on Jul. 13, 2020 for Dimitrios Karampatsis, and U.S. Patent Application Ser. No. 63/051,233 entitled "APPARATUSES, METHODS, AND SYSTEMS FOR ENHANCEMENT FOR SL POWER SAVING" and filed on Jul. 13, 2020 for Karthikeyan Ganesan, all of which are incorporated herein by reference in their entirety.

FIELD

The subject matter disclosed herein relates generally to wireless communications and more particularly relates to radio resource configuration for power saving.

BACKGROUND

In certain wireless communications networks, a user equipment may operate in one or more states that use excessive power. The excessive power usage reduces the capabilities of the user equipment.

BRIEF SUMMARY

Methods for radio resource configuration for power saving are disclosed. Apparatuses and systems also perform the functions of the methods. One embodiment of a method includes monitoring, via a first receiver comprising a wake-up receiver, a sidelink control channel for a wake-up signal. The wake-up signal includes a narrow-band signal transmitted within at least one subchannel in a resource pool, and the wake-up signal is transmitted by at least one transmitter user equipment of a plurality of transmitter user equipments. In some embodiments, the method includes monitoring, via a second receiver, a physical sidelink control channel and a data channel. The second receiver includes a baseband processing unit separate from the first receiver. In certain embodiments, the method includes receiving a radio resource configuration for wake-up signal reception. The radio resource configuration includes candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof. In some embodiments, the method includes receiving, outside an active period, the wake-up signal in a resource indicated by the radio resource configuration. In various embodiments, the method includes determining to wake-up the second receiver based on the wake-up signal. The wake-up signal includes a wake-up indicator bit, a destination identifier, or a combination thereof.

One apparatus for radio resource configuration for power saving includes a processor that: monitors, via a first receiver comprising a wake-up receiver, a sidelink control channel for a wake-up signal, wherein the wake-up signal includes a narrow-band signal transmitted within at least one subchannel in a resource pool, and the wake-up signal is transmitted by at least one transmitter user equipment of a plurality of transmitter user equipments; and monitors, via a second receiver, a physical sidelink control channel and a data channel. The second receiver includes a baseband processing unit separate from the first receiver. In some embodiments, the apparatus includes a receiver that: receives a radio resource configuration for wake-up signal reception, wherein the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof; and receives, outside an active period, the wake-up signal in a resource indicated by the radio resource configuration. In various embodiments, the processor determines to wake-up the second receiver based on the wake-up signal. The wake-up signal includes a wake-up indicator bit, a destination identifier, or a combination thereof.

Another embodiment of a method for radio resource configuration for power saving includes receiving a radio resource configuration including information for power saving during an active time period. The radio resource configuration includes a time slot offset between a first sidelink control channel and a second sidelink control channel. In some embodiments, the method includes selectively decoding information and data transmitted on the second sidelink control channel based on an indication in the first sidelink control channel. In certain embodiments, the method includes transitioning to a discontinuous reception sleep after selectively decoding the information and data.

Another apparatus for radio resource configuration for power saving includes a receiver that receives a radio resource configuration comprising information for power saving during an active time period. The radio resource configuration comprises a time slot offset between a first sidelink control channel and a second sidelink control channel. In various embodiments, the apparatus includes a processor that: selectively decodes information and data transmitted on the second sidelink control channel based on an indication in the first sidelink control channel; and transitions to a discontinuous reception sleep after selectively decoding the information and data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
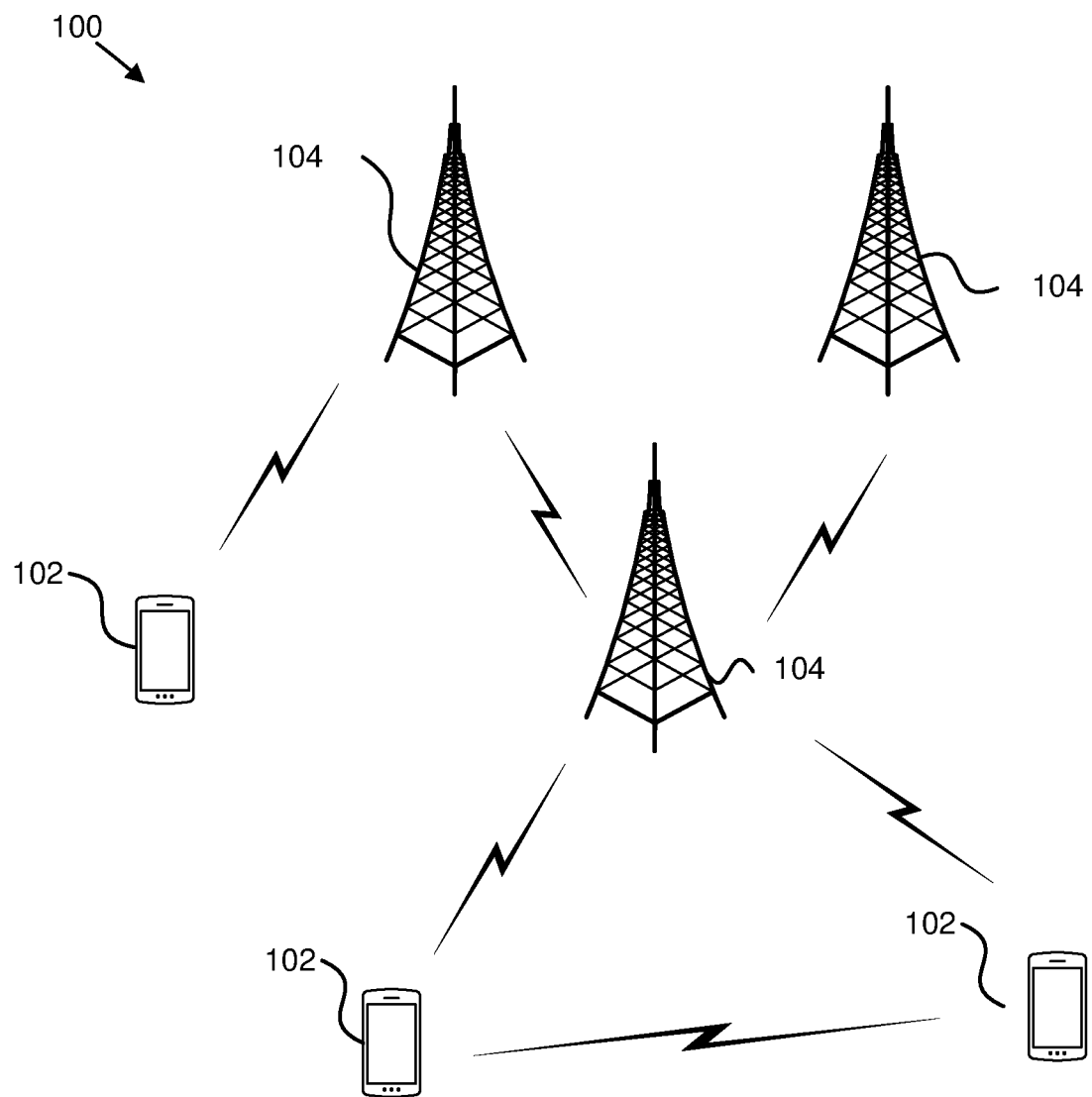
FIG. 1 is a schematic block diagram illustrating one embodiment of a wireless communication system for radio resource configuration for power saving.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for radio resource configuration for power saving. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may monitor, via a first receiver comprising a wake-up receiver, a sidelink control channel for a wake-up signal. The wake-up signal includes a narrow-band signal transmitted within at least one subchannel in a resource pool, and the wake-up signal is transmitted by at least one transmitter user equipment of a plurality of transmitter user equipments. In some embodiments, the remote unit 102 may monitor, via a second receiver, a physical sidelink control channel and a data channel. The second receiver includes a baseband processing unit separate from the first receiver. In certain embodiments, the remote unit 102 may receive a radio resource configuration for wake-up signal reception. The radio resource configuration includes candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof. In some embodiments, the remote unit 102 may receive, outside an active period, the wake-up signal in a resource indicated by the radio resource configuration. In various embodiments, the remote unit 102 may determine to wake-up the second receiver based on the wake-up signal. The wake-up signal includes a wake-up indicator bit, a destination identifier, or a combination thereof. Accordingly, the remote unit 102 may be used for radio resource configuration for power saving.

In certain embodiments, a remote unit 102 may receive a radio resource configuration including information for power saving during an active time period. The radio resource configuration includes a time slot offset between a first sidelink control channel and a second sidelink control channel. In some embodiments, the remote unit 102 may selectively decode information and data transmitted on the second sidelink control channel based on an indication in the first sidelink control channel. In certain embodiments, the remote unit 102 may transition to a discontinuous reception sleep after selectively decoding the information and data. Accordingly, the remote unit 102 may be used for radio resource configuration for power saving.

Figure 2:
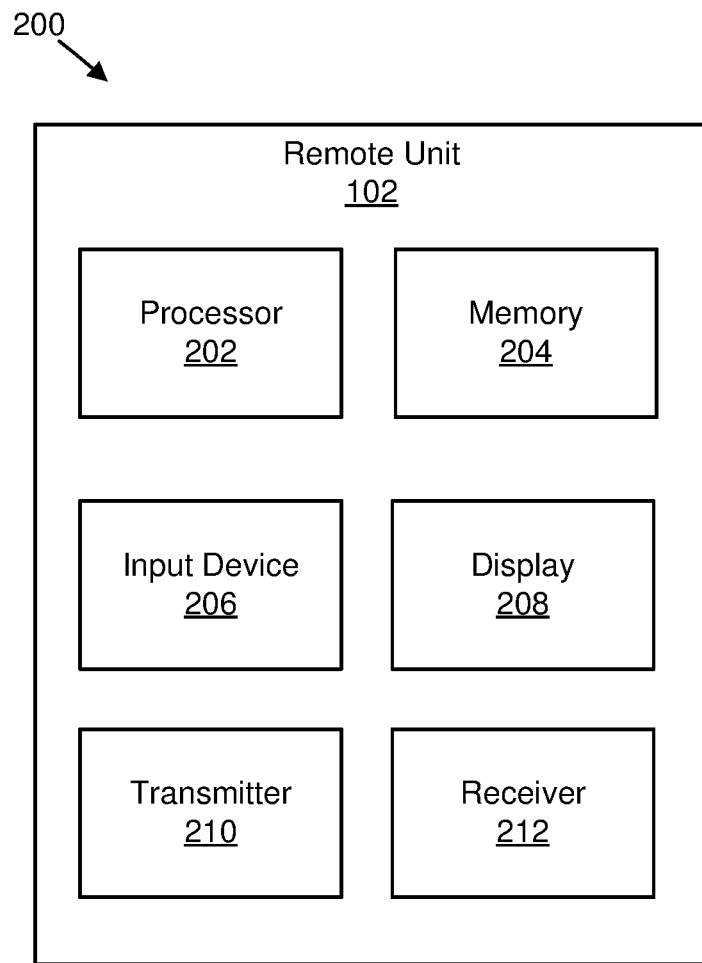
FIG. 2 is a schematic block diagram illustrating one embodiment of an apparatus that may be used for radio resource configuration for power saving.

FIG. 2 depicts one embodiment of an apparatus 200 that may be used for radio resource configuration for power saving. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202: monitors, via a first receiver comprising a wake-up receiver, a sidelink control channel for a wake-up signal, wherein the wake-up signal includes a narrow-band signal transmitted within at least one subchannel in a resource pool, and the wake-up signal is transmitted by at least one transmitter user equipment of a plurality of transmitter user equipments; and monitors, via a second receiver, a physical sidelink control channel and a data channel. The second receiver includes a baseband processing unit separate from the first receiver. In some embodiments, the receiver 212: receives a radio resource configuration for wake-up signal reception, wherein the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof; and receives, outside an active period, the wake-up signal in a resource indicated by the radio resource configuration. In various embodiments, the processor 202 determines to wake-up the second receiver based on the wake-up signal. The wake-up signal includes a wake-up indicator bit, a destination identifier, or a combination thereof.

In some embodiments, the receiver 212 receives a radio resource configuration comprising information for power saving during an active time period. The radio resource configuration comprises a time slot offset between a first sidelink control channel and a second sidelink control channel. In various embodiments, the processor 202: selectively decodes information and data transmitted on the second sidelink control channel based on an indication in the first sidelink control channel; and transitions to a discontinuous reception sleep after selectively decoding the information and data.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
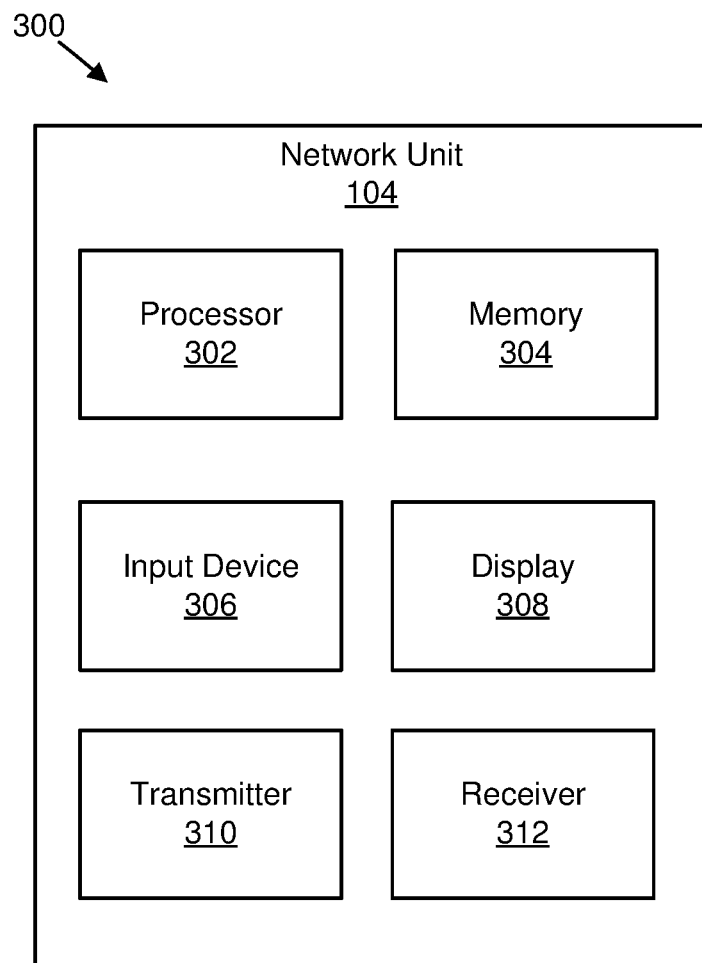
FIG. 3 is a schematic block diagram illustrating one embodiment of an apparatus that may be used for radio resource configuration for power saving.

FIG. 3 depicts one embodiment of an apparatus 300 that may be used for radio resource configuration for power saving. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, power consumption of sidelink ("SL") user equipments ("UEs") may be reduced by optimizing a reception time of vulnerable road user ("VRU") and/or commercial device to device ("D2D") devices. Such embodiments may be based on a wake-up signal ("WUS") signal for sidelink communication, cross slot scheduling, and roadside unit ("RSU") assisted resource allocation.

In some embodiments, power saving enables UEs with battery constraints to perform sidelink operations in a power efficient manner. In such embodiments, sidelink may be designed based on an assumption of "always-on" when the UE operates sidelink. In various embodiments, power saving may be applied for VRUs in vehicle to everything ("V2X") configurations, for UEs in public safety, and for UEs in commercial use environments in which power consumption in the UEs should be minimized.

In certain embodiments, enhanced reliability and reduced latency may enable support of ultra-reliable low-latency ("URLLC") type sidelink environments. The system level reliability and latency performance of sidelink may be affected by communication conditions such as a wireless channel status and an offered load. In such embodiments, sidelink may be expected to have a limitation in achieving high reliability and low latency in some conditions (e.g., if the channel is relatively busy). Various embodiments described herein may enhance reliability and reduce latency to facilitate low latency and high reliability under certain communication conditions.

As used herein, the term eNB and/or gNB may be used for a base station, but they are replaceable by any other radio access node (e.g., base station ("BS"), eNB, gNB, access point ("AP"), NR, etc.). Moreover, even though various embodiments may be described in the context of fifth generation ("5G") new radio ("NR"), the embodiments herein may be equally applicable to other mobile communication systems supporting serving cells and/or carriers configured for sidelink communication over a UE to UE ("PC5") interface.

In a first embodiment, cross slot scheduling may contain an indication of a K0 time slot offset between second sidelink control information ("SCI") and data from that of first SCI. In such an embodiment, an indicator present in the first SCI may provide information about an intended recipient of a message (e.g., for pedestrian to pedestrian ("P2P")). Moreover, a receiver UE may decide to receive and decode the second SCI and data.

Figure 4:
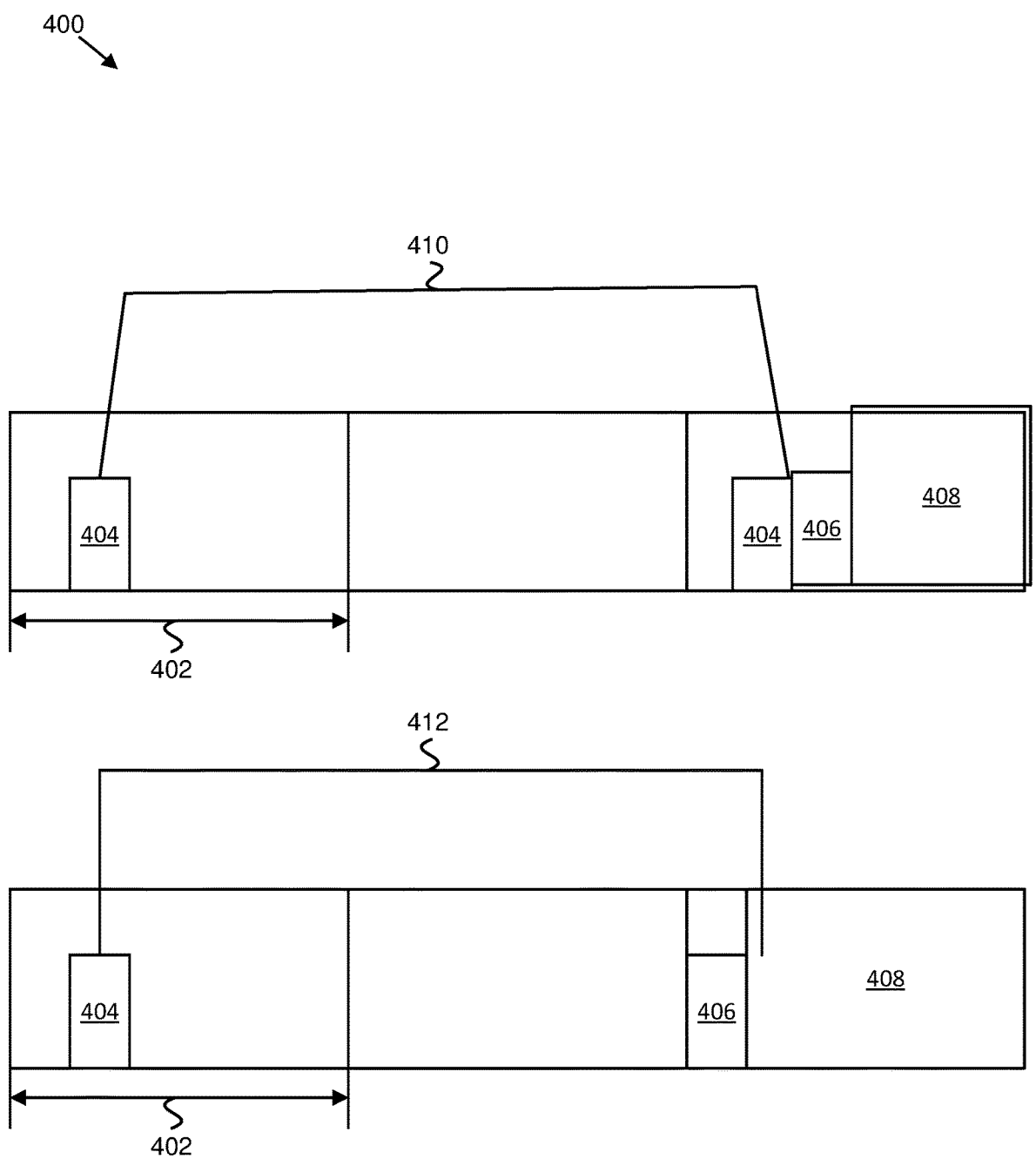
FIG. 4 is a timing diagram illustrating one embodiment of a time slot offset between a 1st SCI and a 2nd SCI and/or PSSCH.

In one embodiment of the first embodiment, as shown in the FIG. 4, a 'K0' time slot offset between transmission of second ("2nd") SCI and a physical sidelink shared channel ("PSSCH") from that of first ("1st") SCI is signaled in a SL grant by a gNB to the TX UE. The TX UE may signal in SCI the time slot offset k0 between the transmission of 2nd SCI and PSSCH from that of 1st SCI to RX UEs. As shown in the FIG. 9, in one implementation of the first embodiment, K0 offset is calculated from the end of the 1st SCI symbol transmission to the beginning of 2nd SCI transmission.

In another implementation of the first embodiment, a time slot offset (K0) is configured and/or preconfigured per resource pool. In addition to the time slot offset, a starting symbol of a PSSCH transmission in the slot may be configured and/or preconfigured per resource pool or dynamically signaled in the SCI.

Figure 9:
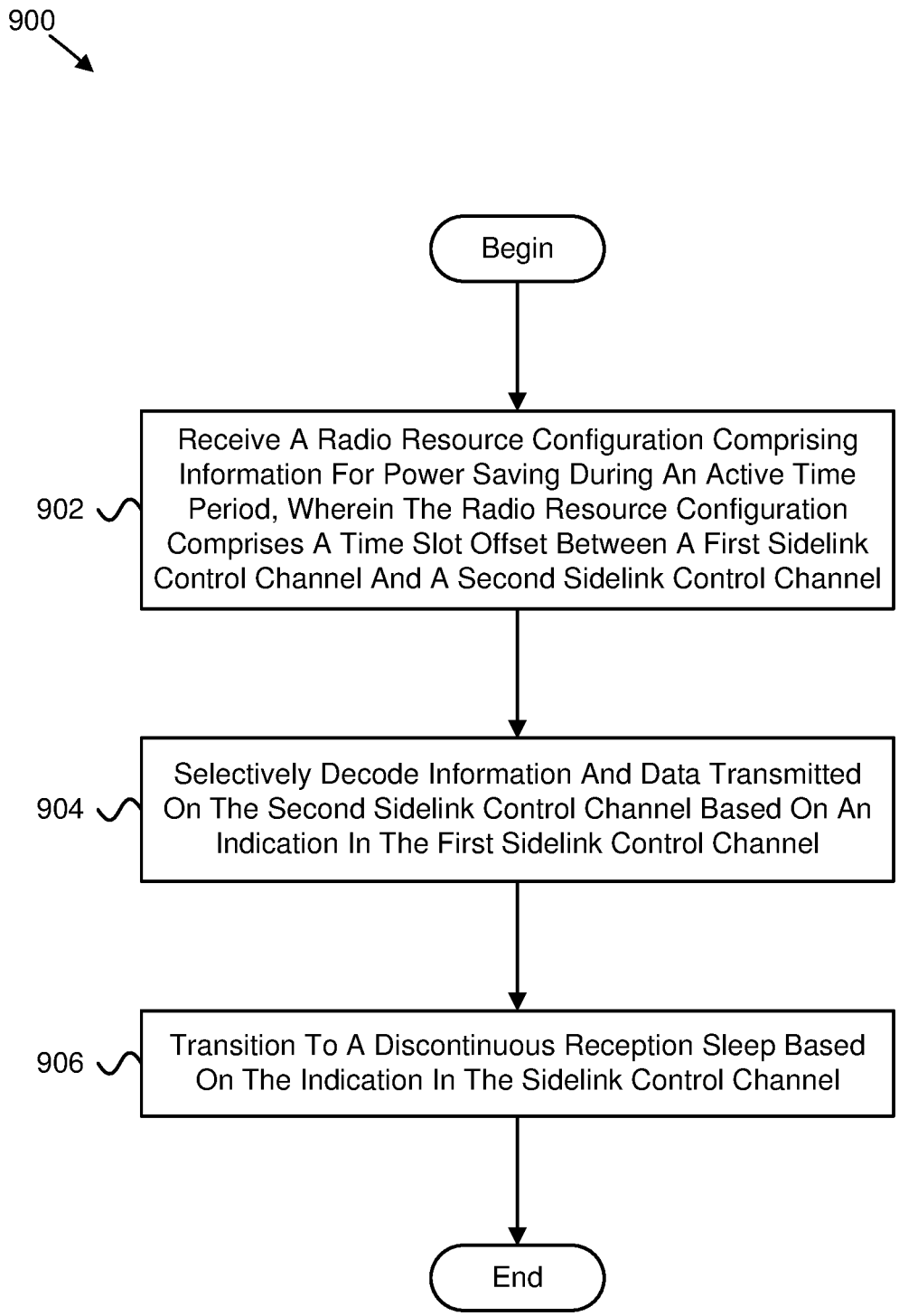
FIG. 9 is a flow chart diagram illustrating another embodiment of a method for radio resource configuration for power saving.

In certain implementations of the first embodiment, 1st SCI is not transmitted at 'K0' time slot offset along with the 2nd SCI and data as shown in FIG. 9

In the second implementation, 1st SCI is repeated at a 'K0' time slot offset along with the 2nd SCI and data as shown in FIG. 9. One or more SCI fields of the repeated 1st SCI (e.g., K0 offset field) may be indicated as an invalid value.

FIG. 4 is a timing diagram 400 illustrating one embodiment of a time slot offset between a 1st SCI and a 2nd SCI and/or a PSSCH transmission. A slot 402 is illustrated in which a 1st SCI 404 is transmitted. A 2nd SCI 406 is also transmitted, followed by a PSSCH transmission 408. In one embodiment, a time slot offset 410 is from the 1st SCI 404 to the 2nd SCI 406. In another embodiment, a time slot offset 412 is from the 1st SCI 404 to the PSSCH transmission 408.

In various embodiments, a transmit ("TX") UE may indicate in the 1st SCI 'one bit' informing RX UEs whether 2nd SCI+PSSCH reception is for vehicular UEs or pedestrian UEs (e.g., pedestrian to vehicle ("P2V") or P2P). In one example, one bit in the 1st SCI (e.g., '0') informs pedestrian receivers not to decode 2nd SCI+PSSCH as the data is intended for vehicular UEs and another bit (e.g., '1') informs pedestrian receivers to decode 2nd SCI+PSSCH as the data is intended for pedestrian UEs and/or VRU receivers.

In certain embodiments, a priority value signaled in 1st SCI may be used to distinguish whether an intended recipient is vehicular receivers and/or pedestrian receivers and the receivers may decide whether to decode a PSSCH transmission. In such embodiments, one of the reserved bit in the 1st SCI may be configured by radio resource control ("RRC") signaling.

Figure 5:
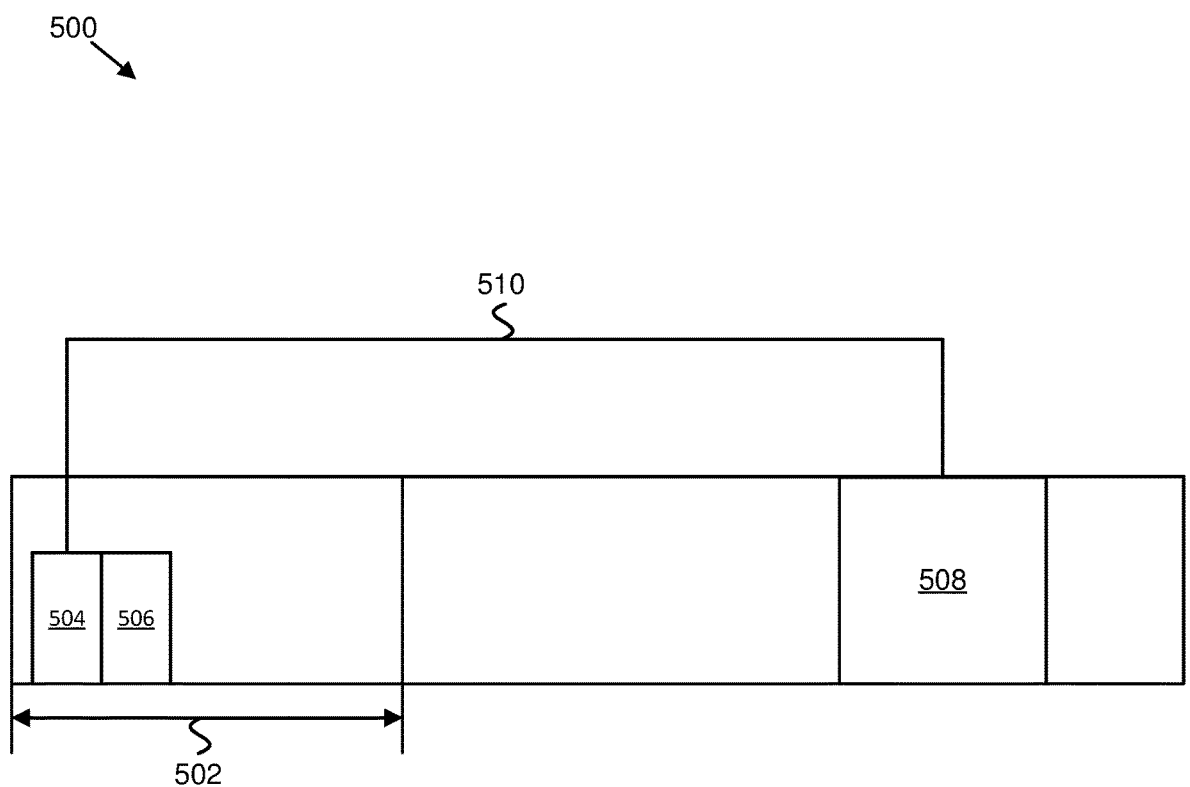
FIG. 5 is a timing diagram illustrating one embodiment of a time slot offset between SCI and PSSCH.

In some embodiments, as shown in FIG. 5, a time offset 'K0' between SCIs (e.g., 1st SCI+2nd SCI) and a PSSCH transmission is signaled in a SL grant by a gNB to the TX UE and the TX UE may signal the time slot offset between the transmission of SCI and the PSSCH transmission in SCI transmitted to RX UEs. In various embodiments, a time slot offset is configured and/or preconfigured per resource pool. In addition to the time slot offset, a starting symbol of a PSSCH transmission in a slot may be configured and/or preconfigured per resource pool or dynamically signaled in SCI. In certain embodiments, 'K0' offset may be calculated from the end of the 1st SCI symbol transmission to the beginning of the PSSCH transmission.

In various embodiments, a 1st SCI and a 2nd SCI are not transmitted at a 'K0' time slot offset along with SL data (e.g., PSSCH transmission). In certain embodiments, a 1st SCI and a 2nd SCI are repeated along with data at the 'K0' offset. One or more SCI fields of a repeated 1st SCI (e.g., K0 offset field) may be indicated as an invalid value.

FIG. 5 is a timing diagram 500 illustrating one embodiment of a time slot offset between SCI and PSSCH. A slot 502 is illustrated in which a 1st SCI 504 and a 2nd SCI 506 are transmitted. A PSSCH transmission 508 is also transmitted. In one embodiment, a time slot offset 510 is from the 1st SCI 504 to the PSSCH transmission 508.

In certain embodiments, a receive ("RX") UE, after decoding SCI, matches a destination identifier ("ID") signaled in the SCI with that of a destination ID configured by higher layers and decides whether receive and decode a PSSCH transmission.

In some embodiments, PC5 radio resource control ("RRC") signaling may be used to inform peer UEs about the 'K0' time slot offset and/or a starting symbol of a PSSCH transmission in a slot.

In certain embodiments, time-domain resource allocation ("TDRA") tables may be defined for physical uplink shared channel ("PUSCH") transmissions and may be defined for PSSCH transmissions. In such embodiments, a TDRA table (e.g., containing up to 16 TDRA patterns) per resource pool (or sidelink bandwidth part ("BWP")) may be configured by RRC signalling, and a scheduling SL grant from a gNB as well the SCI (e.g., 1st SCI or 2nd SCI) from a TX UE indicates which entry of the TDRA table is applicable to the scheduled PSSCH. Each entry of the TDRA table may include three fields: K0, PSSCH mapping type, and start symbol and length.

In some embodiments, K0 is a time gap between SCI and PSSCH in unit of slots (e.g., K0=0 implies same-slot scheduling, and K0>0 implies cross-slot scheduling).

In various embodiments, a mapping type refers to a mapping of a PSSCH: PSSCH-mapping-type-A (e.g., referred to as slot based) or PSSCH-mapping-type-B (e.g., mini-slot based).

In certain embodiments, start symbol and length (e.g., startSymbolAndLength) indicates a starting symbol index and duration of a PSSCH transmission within a slot.

In some embodiments, with a cross-slot scheduling, a UE may sleep during a slot offset configured between SCI and PSSCH and the UE may choose to receive the 2nd SCI and PSSCH depending on an intended recipient of the message (e.g., P2P, P2V).

In a second embodiment, a WUS for sidelink any be monitored by a UE outside its active period and may contain one or more parameters. A resource configuration for WUS may include a slot and/or subchannel, candidate monitoring occasions, and/or changes needed in WUS for sidelink communication containing different cast type.

In the second embodiment, the WUS configuration for sidelink includes one or more parameters such as WUS offset, candidate monitoring occasions, candidate time and/or frequency resources (e.g., slot, subchannels) set to be monitored for WUS, and/or other parameters outside an active duration of the UE.

In various embodiments, the parameters may include: 1) a candidate monitoring occasion providing a plurality of WUS monitoring resources before an active period (e.g., discontinuous reception ("DRX") on duration) starts for a UE; 2) symbols within a slot to be monitored for a WUS; 3) subchannels in a resource pool to be configured for WUS; 4) configuration of SL BWP IDs and corresponding resource pool IDs to be monitored for WUS; 5) WUS offset: indicating a time where the UE starts monitoring WUS prior to a slot where the drx-onDuarationTimer would start; and/or 6) wakeupornot: is indicated by ps-WakeupOrNot whether the UE may not start or whether the UE shall start the drx-onDurationTimer for the next DRX cycle when WUS is not detected.

In certain embodiments, there may be a resource configuration for WUS including. 1) one or more parameters for WUS that may be configured per $RP_{[MB1][KG2]}$ or per destination ID; 2) resource configuration for monitoring WUS in terms of monitoring occasions and subchannels may be configured with respect to a destination ID and/or a destination group ID with higher layer signaling (e.g., gNB provides this information for in-coverage UEs or it is preconfigured for out of coverage UEs); and/or resource configuration for monitoring WUS in terms of monitoring occasions, candidate resources. WUS offset and subchannels may be configured by PC5 RRC signaling.

Figure 6:
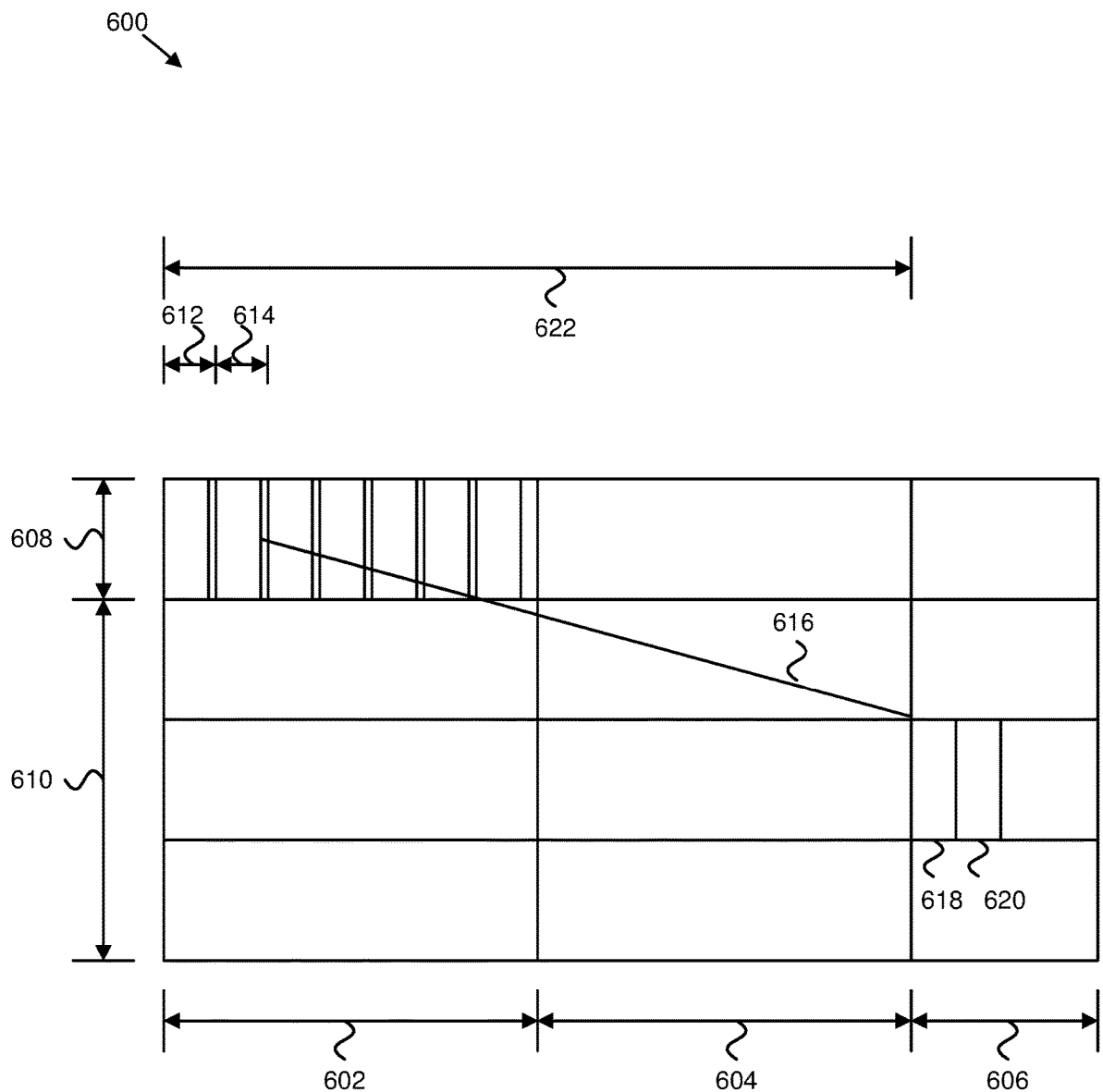
FIG. 6 is a schematic block diagram illustrating one embodiment of a sidelink WUS in which the WUS is monitored outside of an active period of a UE.

In some embodiments, subchannels for SL-WUS transmission may be frequency division multiplexed ("FDMed")

with respect to a subchannel for a PSCCH transmission and a PSSCH transmission and those subchannels are not associated with any SL data transmission as shown in FIG. 6.

In various embodiments, a WUS resource is defined within a subchannel of a resource pool where the WUS resource is in a slot containing multiple WUS blocks. Each of the WUS blocks carries SCI (e.g., SCI-WUS) which includes parameters such as a wake-up indicator, a destination ID, and/or a source ID. A number of WUS blocks in a WUS resource may be configured as part of a RP and each WUS block may contain SCI to be transmitted to a destination ID.

In certain embodiments, for groupcast, each WUS block (e.g., where SCI-WUS is being transmitted) in a WUS resource may be associated with each of the group members based on a member ID either via explicit higher layer semi static signaling from a gNB, from a TX UE or from a RSU. In some embodiments, a WUS block (e.g., where SCI-WUS is being transmitted) may be associated with each member ID of a group implicitly, where a lowest member ID may be assigned to a lowest WUS block in a WUS resource (e.g., one monitoring occasion includes one or more WUS resources for all group members). WUS blocks may be assigned to group member UEs in a time division multiplexed ("TDMed") manner to avoid half duplex issues.

In some embodiments, for unicast, WUS blocks within a WUS resource may be associated with a first UE and a second UE using a PC5 RRC connection by a TX UE, a RSU, or by a gNB.

FIG. 6 is a schematic block diagram 600 illustrating one embodiment of a sidelink WUS in which the WUS is monitored outside of an active period of a UE. The schematic block diagram 600 illustrates, in a time domain, a WUS monitoring period 602 outside a DRX active period, a minimum time gap 604 for processing SCI-WUS, and a DRX active period 606. In a frequency domain, there is one subchannel 608 for WUSs, and subchannels 610 for data. The WUSs include a first WUS block 612, and a second WUS block 614, among other WUS blocks. The second WUS block 614 provides an indication 616 of SCI 618 and data 620 based on a WUS offset 622.

In various embodiments, a WUS contains one or more items of information related to: 1) a wake-up bit indicator (e.g., 1' indicates that a UE starts a DRX-onduration timer and '0' indicates UE does not starts the DRX-onduration timer); 2) an association of a wake-up indicator to a destination ID and/or UE ID in a SCI-WUS field (e.g., each wake-up bit may be associated with a destination ID and/or UE ID)— in one embodiment a cyclic redundancy check ("CRC") of a SCI-WUS may be scrambled with a destination ID and/or UE ID; 3) a source id; and/or 4) information related to a subsequent SCI+data monitoring with relevant information such as SL BWP ID, BWP size, resource pool ID, and/or subchannels to be monitored during an active period—this may include dynamically indicating duration of an active period with SCI-WUS.

Figure 7:
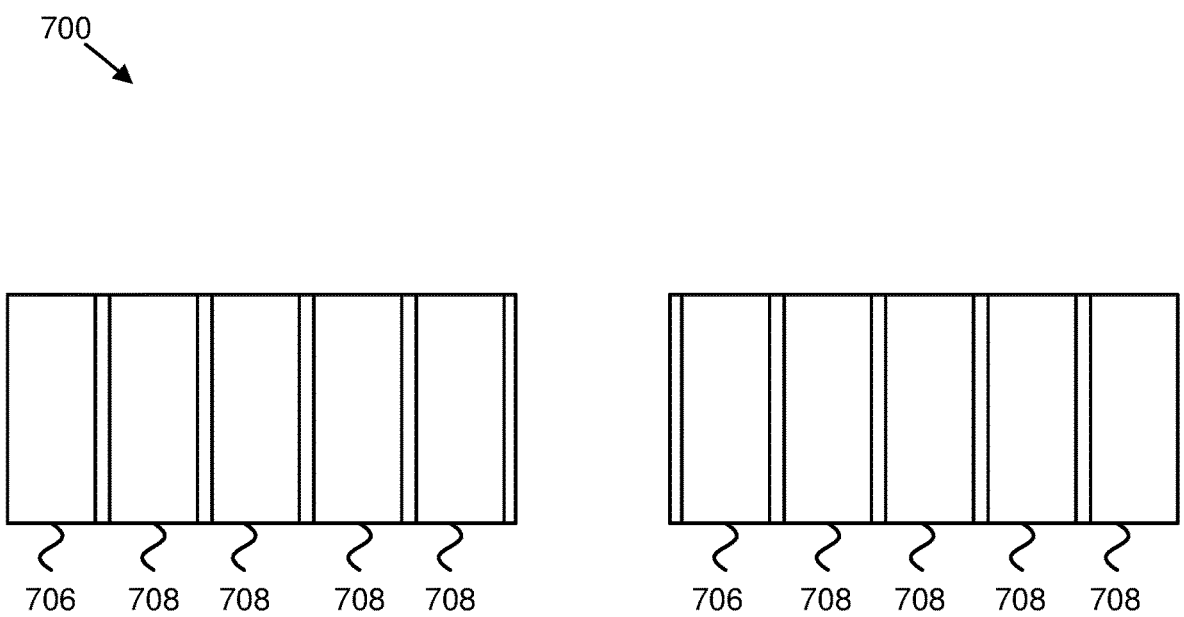
FIG. 7 is a schematic block diagram illustrating one embodiment of a WUS slot with multiplexing options for an AGC symbol.

In certain embodiments, an automatic gain control ("AGC") symbol may be inserted at a first symbol in a SL-WUS slot as shown in FIG. 7 and the AGC symbol may be a repetition of a second symbol. In some embodiments, each WUS block contains an AGC symbol followed by SCI. In various embodiments, a demodulation reference signal ("DMRS") pattern (e.g., in terms of time and/or frequency resource, offset for SCI-WUS) may be configured and/or preconfigured.

In some embodiments, if a receiver UE is configured to monitor WUS outside of an active period of a UE, the receiver UE starts DRX on-duration only if it receives a WUS containing its wake-up bit set to '1' and containing a corresponding destination ID and/or UE ID.

In various embodiments, a UE starts a DRX on-duration timer even if it receives at least one SCI-WUS before a WUS-offset containing its wake-up bit set to 1' from one or more destination IDs provided to a receiver UE.

FIG. 7 is a schematic block diagram 700 illustrating one embodiment of a WUS slot with multiplexing options for an AGC symbol. As illustrated, AGC symbols 706 are multiplexed with WUS blocks 708.

In certain embodiments, for mode 2 (e.g., UE autonomously selecting transmission resources), if a TX UE has data to be transmitted in a next occurrence of a DRX on-duration to one or more destination IDs, the TX UE triggers a WUS resource selection procedure for one or more WUS transmissions within candidate monitoring occasions after a WUS offset and the resource may be selected before a configured minimum time gap for WUS-SCI processing: 1) by randomly selecting one or more WUS blocks within a WUS resource; and/or 2) based on decoding of multiple SCI-WUS in prior monitoring occasions and reporting of candidate WUS resources based on the decoding result and RSRP values to a higher layer. The higher layer may randomly select one or more WUS blocks from the WUS resource for actual transmission.

In a third embodiment, there may be transmission of an early sleep indication if there is no SL data (e.g., go-to-sleep ("GTS") indication).

In the third embodiment, a TX UE may indicate to its peer RX UE belonging to the same destination ID that it has no more data for transmission in a current DRX on-duration. The receiver UE, after receiving a GTS indication, may enters DRX sleep only if it receives a GTS indication from all its group members or transmitters that it is in communication with.

In one implementation of the third embodiment, the indication is transmitted in SCI (e.g., 1st or 2nd SCI) in a last transmission of a transport block ("TB"). In another implementation of the third embodiment, the indication may be transmitted with higher layer signaling (e.g., medium access control ("MAC") control element ("CE") or MAC-sub header).

In some implementations of the third embodiment, a TX UE does not enter DRX sleep until it receives physical sidelink feedback channel ("PSFCH") feedback from all RX UEs after the transmission of a GTS indication. The UEs start an inactivity timer if it receives a negative acknowledgement ("NACK") in a PSFCH.

In another implementation of the third embodiment, a GTS indication may be transmitted by each member UE even if it has no data to be transmitted in an active period. In certain implementations of the third embodiment, a MAC CE may be transmitted with an indication for "no-data-available." In some implementations of the third embodiment, 1st SCI or 2nd SCI may indicate "no-data-available" and this indication may inform RX UEs that there is no associated PSSCH to be decoded.

In a fourth embodiment, there may be changes in a mode 2 resource allocation procedure for SL DRX by taking account that a reservation of SL resources are within an active period of RX UEs.

In the fourth embodiment, if a TX UE has data to be transmitted to one or more destination IDs, the TX UE triggers resource selection and the selection of one or more resources from a candidate resource set for actual data transmission accounts for an on-duration and/or active reception period of a destination ID.

In one implementation of the fourth embodiment, one or more parameters of a DRX cycle (e.g., starting slot and duration of an active period) are shared with lower layers as part of a resource selection trigger from higher layer. Then a UE reports a candidate resource set to a higher layer according to an on-duration and/or active period.

In another implementation of the fourth embodiment, a TX UE may optimize its own active transmit and receive periods by accumulating SL data in a buffer taking into account a packet delay budget ("PDB") for each transmission and may perform a resource selection trigger once the SL data for one or more destination IDs are above a configured threshold.

In a fifth embodiment, there may be changes in a mode 1 resource allocation procedure for associating a SL grant from downlink control information ("DCI") with SL DRX timings of RX UEs.

In the fifth embodiment, a TX UE may report one or more parameters of a DRX cycle such as a starting slot and duration of an active period for all destination IDs in uplink control signaling (e.g., in a sidelink buffer status report or in a UE sidelink assistance report). This may assist a gNB in providing a SL resource for actual data transmission accounting for an on-duration and/or active reception period of a destination ID.

In some embodiments, if one or more parameters of a DRX cycle of sidelink (e.g., starting slot and active period) are not known at a gNB, then the gNB may provide a SL grant in DCI outside an active period of a TX and/or RX UE. In such embodiments, the TX UE may ignore or skip a SL grant if a PDB enables the transmission of SL data in a next occurrence of a DRX on-duration and/or active period. In various embodiments, a TX UE may transmit ACK in a physical uplink control channel ("PUCCH") resource to avoid receiving a retransmission SL grant from a gNB and the TX UE may also transmit an updated SL buffer status report ("BSR"). In certain embodiments, a starting slot and duration of an active period for all configured destination IDs may be transmitted in uplink control signaling.

In various embodiments, a gNB may provide a SL grant in DCI towards the end of an active period of RX UEs. Then a TX UE may ignore or skip the SL grant in the current active period of RX UEs if a PDB enables the transmission of SL data in the next occurrence of a DRX on-duration and/or active period. In certain embodiments, a TX UE may transmit an acknowledgement ("ACK") in a PUCCH resource to avoid receiving a retransmission SL grant from a gNB. Then the TX UE may transmit an updated SL BSR. In some embodiments, a starting slot and duration of an active period for all configured destination IDs may be transmitted in uplink control signaling.

In a sixth embodiment, sensing results in a resource pool may be shared by a RSU for a VRU and/or pedestrian UEs.

In some embodiments, an RSU performs sensing in every slot on a VRU and/or pedestrian to everything ("P2X") resource pool and may share: 1) physical sidelink control channel ("PUCCH") and/or PSSCH reference signal received power ("RSRP") values for each of the subchannels in the resource pool; 2) a candidate resource set (e.g., subchannel index or bitmap of subchannels—where a least significant bit ("LSB") indicates a lowest subchannel index) containing RSRP values below a configured threshold; 3) an interference report based on the RSRP values above a configured threshold; 4) a duration of sensing in that resource pool that includes the starting and/or end of the sensing slots as well the direction of sensing in terms of indicating a transmission configuration indicator ("TCI") state, reference signal ("RS"), beam id, or spatial filter for which the sensing was performed; 5) by broadcast, groupcast, and/or unicast the above results to SL UEs—this may be triggered by a SL UE to the RSU (e.g., using RSU ID) for sharing the sensing results on the specified resource pool—the trigger may be transmitted on SCI, a MAC CE, or PC5 RRC signaling.

In various embodiments, an RSU may indicate RSU location information such as its zone ID and an applicability of sensing results by specifying a minimum communication range ("MCR").

In certain embodiments, a SL UE calculates a pathloss between an RSU and a pedestrian ("P") UE ("P-UE") from its transmission by calculating a distance from a zone ID or with an RSRP measurement for processing the sensing results shared by the RSU. In such embodiments, if the sensing results contain RSRP values per subchannel, then the SL UE may re-calculate and/or re-scale these RSRP values according to a measured pathloss. In one implementation, a set of candidate resources may be reported to a higher layer. In another implementation, the SL UE may further perform short term sensing by monitoring a SCI transmission from other UEs in subchannels for a configured period of slots before reporting a candidate resource set to higher layer.

In some embodiments, if an RSU shares a candidate resource set containing indices or a bitmap of subchannels below a configured threshold, then in one implementation, a SL UE may perform random resource selection on those candidate resources. In such embodiments, in a second implementation, a SL UE may perform short term sensing by monitoring SCI transmissions from other UEs in those subchannels for a configured period of slots before reporting a candidate resource set to a higher layer.

In various embodiments, there may be reporting of sensing results (e.g., Rx_CRS) by an RSU.

In such embodiments, a sensing result (e.g., Rx_CRS) report may contain a bitmap of a subchannel in a resource pool where candidate resources are not sorted according to highest received signal strength indicator ("RSSI") and/or RSRP values. A size of the bitmap may depend on a number of subchannels in a resource pool. In one implementation, an LSB of the bitmap contains a lowest subchannel index and so for. For example, for bitmap 01000111101, subchannel 0, 2, 3, 4, 5, and 9 are selected as candidate resources. In another implementation, a most significant bit ("MSB") of a bitmap may contain a lowest subchannel index.

In various embodiments, a Rx_CRS report contains a subchannel index in a resource pool sorted according to highest RSRP and/or RSSI values. For example, for bitmaps 0000000001, 0000000011, 00000010111, and so forth, subchannel 1, 3, 23, and so forth may be indicated where subchannel 1 contains a highest RSRP and/or RSSI and so forth.

In certain embodiments, a MAC CE may be used to report a Rx_CSR report and/or interference report per resource pool and other values described herein. In such embodiments, a priority of this MAC CE and latency bound may be preconfigured by a gNB or provided by a TX UE. Moreover, in such embodiments, for mode 1: MAC forms a TB based on this MAC CE. A scheduling request ("SR") is configured for this MAC CE or report and a SR will be triggered if the next grant is available (e.g., configured grant ("CG")) is far away from the configured latency bound and a corresponding timer is started if a trigger for a Rx_CSR report is received at the RSU. A Rx_CSR MAC CE may be multiplexed with corresponding unicast data for the destination or the Rx_CSR MAC CE may also be transmitted via groupcast, broadcast, and/or unicast to an entire destination.

In some embodiments, for bode 2: a MAC forms a TB based on a MAC CE to transmit in a first available resource or randomly selected resource from Rx_CSR. T2 min and T2 (e.g., PDB) may be configured according to a latency bound. In various embodiments, PC5 RRC signaling may be used to send a Rx_CSR report or an interference report.

In certain embodiments, a transmission of a report may be made using a PSFCH or may be piggy backed with PSSCH or SCI. In some embodiments, an RSU may indicate transmission of a report using any physical layer ("PHY") control signaling and a corresponding configuration like format to be used (e.g., resource, beta-offset factor, etc.) in SCI, MAC CE, PC5 RRC, and/or semi-statically configured by gNB per resource pool. A PSFCH resource for this format may occupy all or a subset of sub-channels corresponding to a PSSCH transmission.

In various embodiments, a MAC CE priority may be configured differently compared to a channel quality indicator ("CQI") and/or rank indicator ("RI") MAC CE, relative priority, relative remaining PDB, and/or latency bound to determine which one is transmitted if there is not enough space in a grant or resource.

Figure 8:
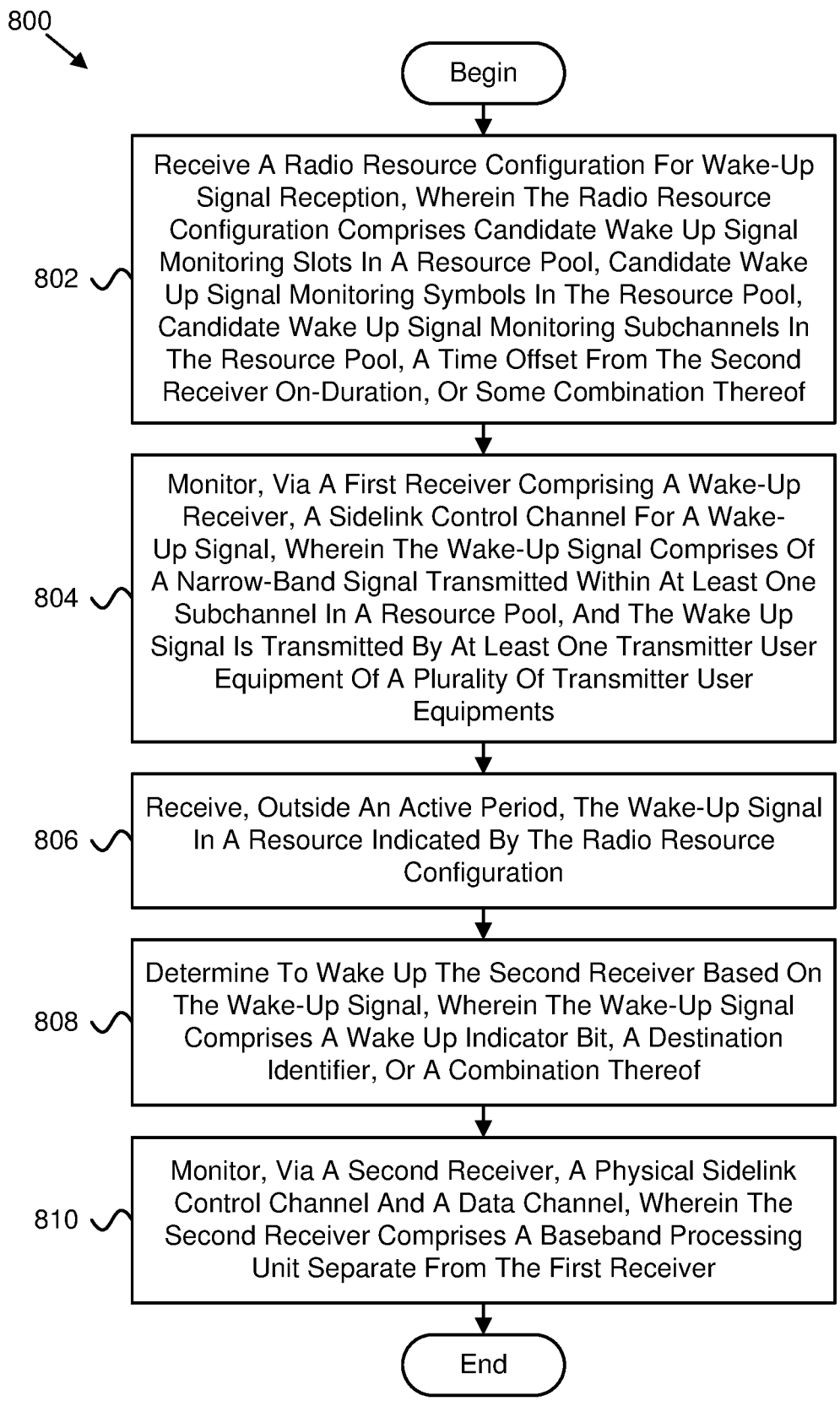
FIG. 8 is a flow chart diagram illustrating one embodiment of a method for radio resource configuration for power saving.

FIG. 8 is a flow chart diagram illustrating one embodiment of a method 800 for radio resource configuration for power saving. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In certain embodiments, the method 800 includes receiving 802 a radio resource configuration for wake-up signal reception. The radio resource configuration includes candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof. In various embodiments, the method 800 includes monitoring 804, via a first receiver comprising a wake-up receiver, a sidelink control channel for a wake-up signal. The wake-up signal includes a narrow-band signal transmitted within at least one subchannel in a resource pool, and the wake-up signal is transmitted by at least one transmitter user equipment of a plurality of transmitter user equipments. In some embodiments, the method 800 includes receiving 806, outside an active period, the wake-up signal in a resource indicated by the radio resource configuration. In various embodiments, the method 800 includes determining 808 to wake-up the second receiver based on the wake-up signal. The wake-up signal includes a wake-up indicator bit, a destination identifier, or a combination thereof. In some embodiments, the method 800 includes monitoring 810, via a second receiver, a physical sidelink control channel and a data channel. The second receiver includes a baseband processing unit separate from the first receiver.

In certain embodiments, the method 800 further comprises receiving the wake-up signal before an active period of a user equipment in subchannels in the resource pool, wherein the wake-up signal is frequency division multiplexed with other subchannels, resource pools, or sidelink bandwidth parts configured for sidelink control and data channel during the active period of the user equipment. In some embodiments, the wake-up signal comprises a resource pool identifier, subchannel identifier, or sidelink bandwidth part identifier for sidelink communications occurring during the active period of the user equipment.

In various embodiments, the method 800 further comprises receiving the wake-up signal in a slot within a subchannel in the resource pool, wherein the resource pool comprises a plurality of wake-up signal blocks, and each wake-up signal block of the plurality of wake-up signal blocks carries sidelink control information of a corresponding wake-up signal for a destination identifier of at least one receiver user equipment. In one embodiment, a number of wake-up signal blocks in a wake-up signal resource is configured as part of the resource pool.

In certain embodiments, the method 800 further comprises receiving a plurality of wake-up signals, wherein each wake-up signal of the plurality of wake-up signals is set to 1' or '0' and has a corresponding destination identifier depending on whether there is data to be transmitted to the destination identifier in a next occurrence of a discontinuous reception active period. In some embodiments, the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof, and the radio resource configuration is configurable per resource pool, destination identifier, PC5 radio resource control connection, or some combination thereof.

In various embodiments, a resource for each wake-up signal is associated with each group member of a wake-up signal block based on a member identifier via explicit higher layer semi static signaling or implicitly. In one embodiment, a lowest member identifier is assigned to a lowest wake-up signal block in a wake-up signal resource. In certain embodiments, wake-up signal blocks are assigned to group member user equipments in a time division multiplexed manner to avoid half duplex issues.

In some embodiments, the method 800 further comprises starting a discontinuous reception on-duration timer even if at least one sidelink control information wake-up signal is received before a wake-up signal offset containing a wake-up bit set to '1' from one or more destination identifiers configured for at least one receiver user equipment.

FIG. 9 is a flow chart diagram illustrating another embodiment of a method 900 for radio resource configuration for power saving. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 a radio resource configuration including information for power saving during an active time period. The radio resource configuration includes a time slot offset between a first sidelink control channel and a second sidelink control channel. In some embodiments, the method 900 includes selectively decoding 904 information and data transmitted on the second sidelink control channel based on an indication in the first sidelink control channel. In certain embodiments, the method 900 includes transitioning 906 to a discontinuous reception sleep after selectively decoding the information and data.

In certain embodiments, the method 900 further comprises receiving the first sidelink control channel transmitted within an active period, wherein the first sidelink control channel comprises the time slot offset indicating an offset of the information and data transmitted on the second sidelink control channel from the first sidelink control channel. In some embodiments, the indication indicates whether an intended recipient is a pedestrian user equipment receiver or a vehicular user equipment receiver.

In various embodiments, the method 900 further comprises receiving the indication in the first sidelink control channel as part of a last transport block transmitted to a plurality of receiver user equipments belonging to a destination, wherein the indication enables early transition to the discontinuous reception sleep indicating no more data is available. In one embodiment, the method 900 further comprises not enter a discontinuous reception sleep until physical sidelink feedback is received from all receiver user equipments. In certain embodiments, the method 900 further comprises starting an inactivity timer in response to receiving a negative acknowledgement in a physical sidelink feedback channel.

In one embodiment, a method comprises: monitoring, via a first receiver comprising a wake-up receiver, a sidelink control channel for a wake-up signal, wherein the wake-up signal comprises a narrow-band signal transmitted within at least one subchannel in a resource pool, and the wake-up signal is transmitted by at least one transmitter user equipment of a plurality of transmitter user equipments; monitoring, via a second receiver, a physical sidelink control channel and a data channel, wherein the second receiver comprises a baseband processing unit separate from the first receiver; receiving a radio resource configuration for wake-up signal reception, wherein the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof; receiving, outside an active period, the wake-up signal in a resource indicated by the radio resource configuration; and determining to wake-up the second receiver based on the wake-up signal, wherein the wake-up signal comprises a wake-up indicator bit, a destination identifier, or a combination thereof.

In certain embodiments, the method further comprises receiving the wake-up signal before an active period of a user equipment in subchannels in the resource pool, wherein the wake-up signal is frequency division multiplexed with other subchannels, resource pools, or sidelink bandwidth parts configured for sidelink control and data channel during the active period of the user equipment.

In some embodiments, the wake-up signal comprises a resource pool identifier, subchannel identifier, or sidelink bandwidth part identifier for sidelink communications occurring during the active period of the user equipment.

In various embodiments, the method further comprises receiving the wake-up signal in a slot within a subchannel in the resource pool, wherein the resource pool comprises a plurality of wake-up signal blocks, and each wake-up signal block of the plurality of wake-up signal blocks carries sidelink control information of a corresponding wake-up signal for a destination identifier of at least one receiver user equipment.

In one embodiment, a number of wake-up signal blocks in a wake-up signal resource is configured as part of the resource pool.

In certain embodiments, the method further comprises receiving a plurality of wake-up signals, wherein each wake-up signal of the plurality of wake-up signals is set to '1' or '0' and has a corresponding destination identifier depending on whether there is data to be transmitted to the destination identifier in a next occurrence of a discontinuous reception active period.

In some embodiments, the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof, and the radio resource configuration is configurable per resource pool, destination identifier, PC5 radio resource control connection, or some combination thereof.

In various embodiments, a resource for each wake-up signal is associated with each group member of a wake-up signal block based on a member identifier via explicit higher layer semi static signaling or implicitly.

In one embodiment, a lowest member identifier is assigned to a lowest wake-up signal block in a wake-up signal resource.

In certain embodiments, wake-up signal blocks are assigned to group member user equipments in a time division multiplexed manner to avoid half duplex issues.

In some embodiments, the method further comprises starting a discontinuous reception on-duration timer even if at least one sidelink control information wake-up signal is received before a wake-up signal offset containing a wake-up bit set to '1' from one or more destination identifiers configured for at least one receiver user equipment.

In one embodiment, an apparatus comprises: a processor that: monitors, via a first receiver comprising a wake-up receiver, a sidelink control channel for a wake-up signal, wherein the wake-up signal comprises a narrow-band signal transmitted within at least one subchannel in a resource pool, and the wake-up signal is transmitted by at least one transmitter user equipment of a plurality of transmitter user equipments; and monitors, via a second receiver, a physical sidelink control channel and a data channel, wherein the second receiver comprises a baseband processing unit separate from the first receiver; and a receiver that: receives a radio resource configuration for wake-up signal reception, wherein the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof; and receives, outside an active period, the wake-up signal in a resource indicated by the radio resource configuration; wherein the processor determines to wake-up the second receiver based on the wake-up signal, wherein the wake-up signal comprises a wake-up indicator bit, a destination identifier, or a combination thereof.

In certain embodiments, the receiver receives the wake-up signal before an active period of a user equipment in subchannels in the resource pool, and the wake-up signal is frequency division multiplexed with other subchannels, resource pools, or sidelink bandwidth parts configured for sidelink control and data channel during the active period of the user equipment.

In some embodiments, the wake-up signal comprises a resource pool identifier, subchannel identifier, or sidelink bandwidth part identifier for sidelink communications occurring during the active period of the user equipment.

In various embodiments, the receiver receives the wake-up signal in a slot within a subchannel in the resource pool, wherein the resource pool comprises a plurality of wake-up signal blocks, and each wake-up signal block of the plurality of wake-up signal blocks carries sidelink control information of a corresponding wake-up signal for a destination identifier of at least one receiver user equipment.

In one embodiment, a number of wake-up signal blocks in a wake-up signal resource is configured as part of the resource pool.

In certain embodiments, the receiver receives a plurality of wake-up signals, wherein each wake-up signal of the plurality of wake-up signals is set to '1' or '0' and has a corresponding destination identifier depending on whether there is data to be transmitted to the destination identifier in a next occurrence of a discontinuous reception active period.

In some embodiments, the radio resource configuration comprises candidate wake-up signal monitoring slots in a resource pool, candidate wake-up signal monitoring symbols in the resource pool, candidate wake-up signal monitoring subchannels in the resource pool, a time offset from the second receiver on-duration, or some combination thereof, and the radio resource configuration is configurable per resource pool, destination identifier, PC5 radio resource control connection, or some combination thereof.

In various embodiments, a resource for each wake-up signal is associated with each group member of a wake-up signal block based on a member identifier via explicit higher layer semi static signaling or implicitly.

In one embodiment, a lowest member identifier is assigned to a lowest wake-up signal block in a wake-up signal resource.

In certain embodiments, wake-up signal blocks are assigned to group member user equipments in a time division multiplexed manner to avoid half duplex issues.

In some embodiments, the processor starts a discontinuous reception on-duration timer even if at least one sidelink control information wake-up signal is received before a wake-up signal offset containing a wake-up bit set to '1' from one or more destination identifiers configured for at least one receiver user equipment.

In one embodiment, a method comprises: receiving a radio resource configuration comprising information for power saving during an active time period, wherein the radio resource configuration comprises a time slot offset between a first sidelink control channel and a second sidelink control channel; selectively decoding information and data transmitted on the second sidelink control channel based on an indication in the first sidelink control channel; and transitioning to a discontinuous reception sleep after selectively decoding the information and data.

In certain embodiments, the method further comprises receiving the first sidelink control channel transmitted within an active period, wherein the first sidelink control channel comprises the time slot offset indicating an offset of the information and data transmitted on the second sidelink control channel from the first sidelink control channel.

In some embodiments, the indication indicates whether an intended recipient is a pedestrian user equipment receiver or a vehicular user equipment receiver.

In various embodiments, the method further comprises receiving the indication in the first sidelink control channel as part of a last transport block transmitted to a plurality of receiver user equipments belonging to a destination, wherein the indication enables early transition to the discontinuous reception sleep indicating no more data is available.

In one embodiment, the method further comprises not enter a discontinuous reception sleep until physical sidelink feedback is received from all receiver user equipments.

In certain embodiments, the method further comprises starting an inactivity timer in response to receiving a negative acknowledgement in a physical sidelink feedback channel.

In one embodiment, an apparatus comprises: a receiver that receives a radio resource configuration comprising information for power saving during an active time period, wherein the radio resource configuration comprises a time slot offset between a first sidelink control channel and a second sidelink control channel; and a processor that: selectively decodes information and data transmitted on the second sidelink control channel based on an indication in the first sidelink control channel; and transitions to a discontinuous reception sleep after selectively decoding the information and data.

In certain embodiments, the receiver receives the first sidelink control channel transmitted within an active period, and the first sidelink control channel comprises the time slot offset indicating an offset of the information and data transmitted on the second sidelink control channel from the first sidelink control channel.

In some embodiments, the indication indicates whether an intended recipient is a pedestrian user equipment receiver or a vehicular user equipment receiver.

In various embodiments, the receiver receives the indication in the first sidelink control channel as part of a last transport block transmitted to a plurality of receiver user equipments belonging to a destination, and the indication enables early transition to the discontinuous reception sleep indicating no more data is available.

In one embodiment, the processor does not enter a discontinuous reception sleep until physical sidelink feedback is received from all receiver user equipments.

In certain embodiments, the processor starts an inactivity timer in response to receiving a negative acknowledgement in a physical sidelink feedback channel.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
      monitor, via a first receiver comprising a wake-up receiver, a sidelink control channel for a wake-up signal, wherein the wake-up signal comprises a narrow-band signal transmitted within at least one subchannel in a resource pool, and the wake-up signal is transmitted by at least one transmitter UE of a plurality of transmitter UEs, and wherein the wake-up receiver comprises a narrowband RF front end and is configured to operate without baseband synchronization;
      monitor, via a second receiver, a physical sidelink control channel and a data channel, wherein the second receiver comprises a baseband processing unit separate from the first receiver, and wherein the second receiver is activated in response to the wake-up signal received by the wake-up receiver;
      receive a radio resource configuration (RRC) for wake-up signal reception, wherein the RRC comprises one or more of candidate wake-up signal monitoring slots in a resource pool, candidate wake-up signal monitoring symbols in the resource pool, candidate wake-up signal monitoring subchannels in the resource pool, or a time offset from a second receiver on-duration;

receive, outside an active period, the wake-up signal in a resource indicated by the RRC;

determine whether the UE is addressed based on a wake-up indicator bit, or a destination identifier, or both included in the wake-up signal; and determine to wake-up the second receiver based on the wake-up signal, wherein the second receiver enables sidelink control or data reception during a configured on-duration.

2. The UE of claim 1, wherein the at least one processor is configured to cause the UE to receive the wake-up signal before the active period of a UE in the subchannels in the resource pool, and the wake-up signal is frequency division multiplexed with other subchannels, resource pools, or sidelink bandwidth parts configured for the sidelink control and the data channel during the active period of the UE.

3. The UE of claim 2, wherein the wake-up signal comprises a resource pool identifier, subchannel identifier, or sidelink bandwidth part identifier for sidelink communications occurring during the active period of the UE.

4. The UE of claim 1, wherein the at least one processor is configured to cause the UE to receive the wake-up signal in a slot within a subchannel in the resource pool, wherein the resource pool comprises a plurality of wake-up signal blocks, and each wake-up signal block of the plurality of wake-up signal blocks carries sidelink control information (SCI) of a corresponding wake-up signal for a destination identifier of at least one receiver UE.

5. The UE of claim 4, wherein a number of wake-up signal blocks in a wake-up signal resource is configured as part of the resource pool.

6. The UE of claim 1, wherein the at least one processor is configured to cause the UE to receive a plurality of wake-up signals, wherein each wake-up signal of the plurality of wake-up signals is set to '1' or '0' and has a corresponding destination identifier depending on whether there is data to be transmitted to the destination identifier in a next occurrence of a discontinuous reception (DRX) active period.

7. The UE of claim 1, wherein the RRC comprises one or more of candidate wake-up signal monitoring slots in a resource pool, candidate wake-up signal monitoring symbols in the resource pool, candidate wake-up signal monitoring the subchannels in the resource pool, or a time offset from the second receiver on-duration, and the RRC is configurable per one or more of resource pool, destination identifier, or PC5 radio resource control connection.

8. The UE of claim 1, wherein: a resource for each wake-up signal is associated with one or more of each group member of a wake-up signal block based on a member identifier via explicit higher layer semi static signaling or implicitly, a lowest member identifier is assigned to a lowest wake-up signal block in a wake-up signal resource, or wake-up signal blocks are assigned to group member UEs in a time division multiplexed manner to avoid half duplex issues.

9. The UE of claim 1, wherein the at least one processor is configured to start a discontinuous reception (DRX) on-duration timer even if at least one sidelink control information (SCI) wake-up signal is received before a wake-up signal offset containing a wake-up bit set to '1' from one or more destination identifiers configured for at least one receiver UE.

10. A method performed by a user equipment (UE), comprising:

monitoring, via a first receiver comprising a wake-up receiver, a sidelink control channel for a wake-up signal, wherein the wake-up signal comprises a narrowband signal transmitted within at least one subchannel in a resource pool, and the wake-up signal is transmitted by at least one transmitter UE of a plurality of transmitter UEs, and wherein the wake-up receiver comprises a narrowband RF front end and is configured to operate without baseband synchronization;

monitoring, via a second receiver, a physical sidelink control channel and a data channel, wherein the second receiver comprises a baseband processing unit separate from the first receiver, and wherein the second receiver is activated in response to the wake-up signal received by the wake-up receiver;

receiving a radio resource configuration (RRC) for wake-up signal reception, wherein the RRC comprises one or more of candidate wake-up signal monitoring slots in a resource pool, candidate wake-up signal monitoring symbols in the resource pool, candidate wake-up signal monitoring subchannels in the resource pool, or a time offset from a second receiver on-duration;

receiving, outside an active period, the wake-up signal in a resource indicated by the RRC;

determining whether the UE is addressed based on a wake-up indicator bit, or a destination identifier, or both included in the wake-up signal; and determining to wake-up the second receiver based on the wake-up signal, wherein the second receiver enables sidelink control or data reception during a configured on-duration.

11. The method of claim 10, further comprising receiving the wake-up signal before the active period of a UE in the subchannels in the resource pool, and the wake-up signal is frequency division multiplexed with other subchannels, resource pools, or sidelink bandwidth parts configured for the sidelink control and the data channel during the active period of the UE.

12. The method of claim 11, wherein the wake-up signal comprises a resource pool identifier, subchannel identifier, or sidelink bandwidth part identifier for sidelink communications occurring during the active period of the UE.

13. The method of claim 10, further comprising receiving the wake-up signal in a slot within a subchannel in the resource pool, wherein the resource pool comprises a plurality of wake-up signal blocks, and each wake-up signal block of the plurality of wake-up signal blocks carries sidelink control information (SCI) of a corresponding wake-up signal for a destination identifier of at least one receiver UE.

14. The method of claim 13, wherein a number of wake-up signal blocks in a wake-up signal resource is configured as part of the resource pool.

* * * * *